Oct. 18, 1960

L. E. EDELMAN ET AL 2,956,613

TREATED GLASS CLOTH INSULATION MAKING

Filed July 5, 1957

WITNESSES
Edwin E. Bassler
Charles V. Board

INVENTORS
Leonard E. Edelman,
Robert H. Runk & Walter J. Adamik
BY
Frederick Shapoe
ATTORNEY

United States Patent Office 2,956,613
Patented Oct. 18, 1960

2,956,613

TREATED GLASS CLOTH INSULATION MAKING

Leonard E. Edelman, Penn Township, Allegheny County, Robert H. Runk, Forest Hills, and Walter J. Adamik, Penn Township, Westmoreland, County, Pa., assignors to Westinghouse Electric Corporation, East Pittsburgh, Pa., a corporation of Pennsylvania Filed July 5, 1957, Ser. No. 670,319

2 Claims. (Cl. 154—2.6)

This invention relates to treated glass cloth adaptable for use as electrical insulation, to the method of preparing the said treated glass fabric and to electrical conductors insulated therewith.

The object of this invention is to provide treated glass cloth adaptable for use as electrical insulation comprising glass fiber cloth impregnated and coated with a specific epoxide resin composition.

Another object of this invention is to provide a method of treating glass fiber cloth with a specific epoxide resin composition so as to provide treated glass cloth adaptable for use as electrical insulation.

Other objects of the invention will, in part, be obvious, and will, in part, appear hereinafter.

Figure 1:
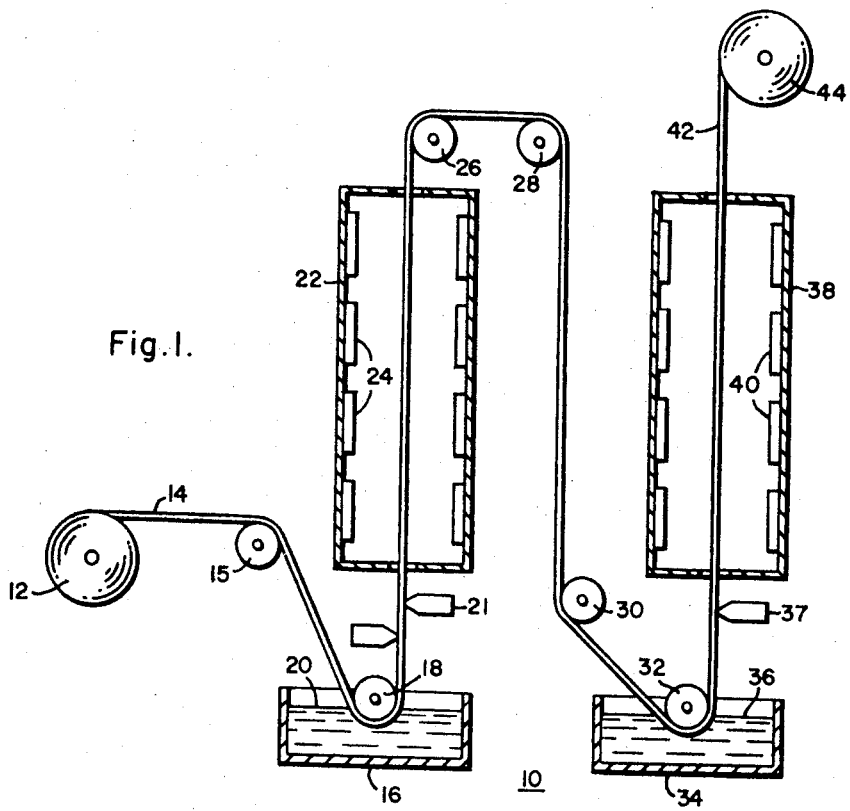
Figure 2:
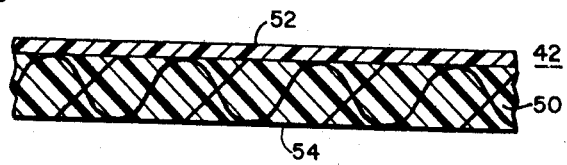

For a more complete understanding of the nature and objects of this invention, reference is made to the following description taken in conjunction with the accompanying drawing wherein:

Fig. 1 is a schematic illustration, partly in cross section, of apparatus suitable for use in preparing the treated glass cloth of this invention, and Fig. 2 is a view in cross section of a length of tape prepared in accordance with this invention.

In accordance with this invention, treated glass cloth adaptable for insulating electrical conductors is prepared by impregnating and coating glass fiber cloth with a thermosettable epoxide resin composition. The treated glass fabric of this invention may be cut into tapes and applied to electrical conductors by wrapping the tape on the electrical conductor in a lapping fashion so that there are several wrappings or layers of the tape on the electrical conductor. The wrapped conductor is then subjected to heat and pressure so as to advance the epoxide resin composition to the infusible and insoluble state. The insulation thereby provided on the electrical conductor has good physical strength and good dielectric strength.

The glass cloth employed in carrying out this invention preferably comprises woven glass fiber cloth prepared from continuous filament glass fibers for highest strength applications. Woven cloth of a thickness of from about 2 to 20 mils has given good results. Where service conditions are not severe, staple glass fibers, woven or knitted or even felted into a strong sheet or mat may be employed.

The potentially thermosettable epoxide resin composition employed is composed essentially of an epoxide resin, a specific catalyst and a thixotropic agent. Fillers, as for example, talc, finely ground silica and colored oxides may be incorporated in the composition if desired. The colored oxide fillers can be used to distinctively color the tape for identification purposes.

In preparing the resinous compositions of this invention, there is employed a resinous polymeric epoxide or glycidyl polyether. Such epoxides or glycidyl polyethers may be obtained by reacting predetermined amounts of at least one polyhydric phenol or polyhydric alcohol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bisphenol "A"), 4,4'-dihydroxy-diphenyl-methyl-methane and 4,4'-dihydroxy-diphenyl-methane. In admixture with the named polynuclear phenols, use also may be made of those polynuclear phenols wherein the phenol nuclei are joined by sulfur bridges such for example as 4,4'-dihydroxy-diphenyl-sulfone. Examples of suitable polyhydric alcohols include glycerol, propylene glycol and 1,5-pentanediol.

While it is preferred to use epichlorohydrin as the epihalohydrin in the preparation of the resinous polymeric epoxide starting materials of the present invention, other epihalohydrins, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The product of the reaction, instead of being a single simple compound, is generally a complex mixture of glycidyl polyethers, but the principal product may be represented by the formula:

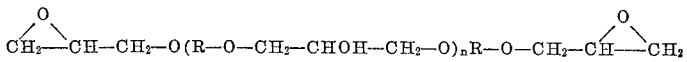

where $n$ is an integer of the series, 0,1,2,3 . . ., and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol suitable for use in this invention, has a 1,2-epoxy equivalency greater than 1.0. By epoxy equivalency reference is made to the average number of 1,2-epoxy groups

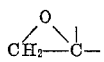

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

In other cases the epoxide equivalency is given in terms of epoxide equivalents in 100 grams of the resin, and this may vary from about 0.08 to 0.70. Also, epoxide equivalent is often expressed as the number of grams of resin containing one equivalent of epoxide.

The 1,2 epoxide value of the glycidyl polyether is determined by heating a weighted sample of the ether with an excess of 0.2 N pyridinium chloride in chloroform solution at the boiling point under reflux for 2 hours whereby the pyridinium chloride hydrochlorinates the epoxy groups to chlorohydrin groups. After cooling, the excess pyridinium chloride is back-titrated with 0.1 N sodium hydroxide in methanol to the phenolphthalein end point.

Resinous polymeric epoxides or glycidyl polyethers suitable for use in accordance with this invention may be prepared by admixing and reacting from one to two mol proportions of epihalohydrin, preferably epichlorohydrin, with about one mol proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrin added thereto, or an aqueous solution of alkali and bis-phenol "A" may be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

Many of the epoxide resins are sold under the name of Epon resins by Shell Chemical Corporation and under the name of Araldite resins by the Ciba Company. Data on some of the Epon resins is given in the table below:

TABLE I

| Epon No. | Epoxide Equivalent | Approximate Esterification Equivalent | M.P., 0° C. |
|---|---|---|---|
| 1004 | 905–985 | 175 | 97–103 |
| 1007 | 1,600–1,900 | 190 | 127–133 |
| 1009 | 2,400–4,000 | 200 | 145–155 |
| 1001 | 450–525 | 130 | 65–76 |

In carrying out this invention, a curing catalytic composition comprising a borate ester and a trialkylolamine-titanate ester is mixed with the glycidyl polyether. The resulting mixture is highly stable at room temperatures, yet will cure rapidly at temperatures within the range of from 100° C. to 200° C. The borate ester is employed in an amount equal to from 2% to 25% by weight, based on the weight of the polyether and the trialkylolamine-titanate ester is employed in an amount equal to from about 2% to 25%, by weight, based on the weight of the polyether.

The borate esters forming a portion of the curing catalyst of this invention are well known in the art and include those materials having the following structural formula:

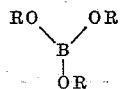

where R may be an aliphatic radical including, for example, methyl, ethyl, propyl, isopropyl, butyl, and isobutyl; a cyclic group including, for example, cyclohexyl; or an aromatic group including, for example, benzyl, phenyl and methyl-phenyl. A mixture of two or three different radicals may be present in a single borate ester.

The trialkylolamine-titanate ester complex portion of the curing catalyst employed in accordance with this invention is a chelating agent well known in the art, represented by the following structural formula:

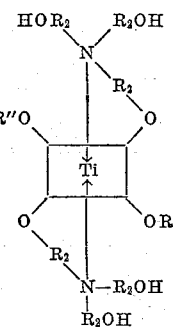

wherein $R_2$ is a bivalent alkylene radical and $R'$ and $R''$ are monovalent aliphatic groups including, for example, methyl, ethyl, propyl, isopropyl, butyl, and isobutyl; a cyclic group including, for example, cyclohexyl; or an aromatic group including, for example, benzyl, phenyl and methyl-phenyl. These chelated titanium esters are not distillable nor are they crystallizable. They will contain a molar ratio of trialkylolamine to titanium within the range of substantially 2:1. They may be prepared by reacting one mol of a titanium ester with two mols of a trialkylolamine and distilling off two mols of the lower boiling alcohol derived from the titanium ester. As a specific example of the preparation of a chelating ester which has been found to be particularly suitable for use in accordance with this invention the following is given.

One mol of tetraisopropyl titanate is reacted with two mols of triethanolamine with two mols of isopropyl alcohol being distilled off. The two remaining isopropyl groups represented by $R'$ and $R''$ in the formula above then may be further reacted with higher boiling alcohols to replace one or two of the isopropyl groups with a higher alkyl or an aryl group. The triethanolamine titanate esters have given outstanding results.

The following examples illustrate the preparation of catalysts suitable for use in curing epoxides in accordance with this invention.

*Example I*

An example of a suitable catalyst is a mixture comprising 11.8 parts by weight of butyl borate and 10.8 parts by weight of isopropyl triethanolamine-titanate complex.

*Example II*

Another example of a suitable catalyst is a mixture of 55.8 parts by weight of cresyl triethanolamine-titanate ester and 66.4 parts by weight of cresyl borate.

The cresyl triethanolamine-titanate ester is prepared by heating, with stirring and nitrogen sparging, a mixture of one mol (107 grams) of a commercial mixture of ortho, meta, and para-cresol and ½ mol (231 grams) of isopropyl triethanolamine-titanate complex. Heating at a temperature of 160° C. is carried out until 60 grams of isopropyl alcohol distill from the mixture.

For a more detailed description of the curing catalyst employed in this invention reference is made to application Serial No. 491,180, filed February 28, 1955, now U.S. Patent No. 2,809,184, dated October 8, 1957, and assigned to the assignee of the present invention.

The following example illustrates the preparation of a glycidyl polyether suitable for use in this invention.

Example III

A glycidyl polyether is prepared by introducing into a reaction vessel equipped with agitator, cooling and heating means, distillation condenser and receiver, 513 parts (2.25 mols) of bis-phenol, 2,2-bis (4-hydroxyphenyl) propane, and 208.1 parts (2.25 mols) of epichlorohydrin and 10.4 parts of water. A total of 188 parts of 97.5% sodium hydroxide, corresponding to 2.04 mols (2% excess) per mol of epichlorohydrin, is added in increments over several hours. The temperature in the vessel does not rise above 100° C. and is generally not above 95° C. After all the sodium hydroxide is added, the excess water and epichlorohydrin is removed by evacuating to an absolute pressure of 50 mm. of mercury at 150° C. The vessel is then cooled to 90° C. and 36 parts of benzene added, and then cooled further to 40° C. with salt precipitating from the solution. The solution is filtered to remove the salt, the salt being washed with 36 additional parts of benzene, the benzene washing out any polyether resin and then being added to the filtrate and both returned to the vessel. The benzene is then distilled off, the polyether resin being heated at an increasing temperature until at 125° C. vacuum is applied and distillation is continued until the vessel contents are at 170° C. at 25 mm. of mercury absolute pressure. The glycidyl polyether had a viscosity of Z-3 on the Gardner-Holdt scale.

Thixotropic agents that may be employed in admixture with the glycidyl polyethers and the curing catalysts to form the resinous composition employed in carrying out this invention are well known in the art. Examples of suitable thixotropic agents are bentonite-amine reaction products and estersils.

The bentonite-amine reaction products employed as thixotropic agents are composed of a montmorillonite mineral in which at least a part of the cation content of the mineral has been replaced by a cation of an organic base. Clays that contain as a primary constituent a mineral of the group known as montmorillonites are generally referred to as bentonites. Bentonites in their raw state are hydrophillic but upon reacting with organic bases or their salts become organophilic products.

More specifically, a bentonite clay of the character described and exhibiting substantial base-exchange capacity is reacted with an organic compound, more particularly one generally known as an onium compound, by substituting for the clay cation the cation of the organic compound. The reaction product may be prepared not only from a base-salt reacted with a clay-salt, but from a free base reacted with an acid clay.

Examples of organic base compounds and their salts are salts of aliphatic, cyclic, aromatic, and heterocyclic amines; primary, secondary, tertiary and polyamines; quaternary ammonium compounds, as well as other monovalent or polyvalent onium compounds.

In practicing this invention, aliphatic amine salts having from 12 to 20 carbon atoms, for example, hexadecyl amine salts and octadecyl amine salts, yield excellent results. The ratio of the amine compound to bentonite may be varied within certain limits in converting the bentonite to the organophilic condition. In general, however, it is desirable to react the amine salt with the bentonite in the approximate ratio of 100 milliequivalents of amine salt to 100 grams of bentonite. Reaction products produced within this ratio give the maximum swelling as tested in nitrobenzene.

It will be understood that when reference is made to basic organic onium compounds such as amines it is implied that before reacting with the clay by base-exchange the amine is converted to the onium form either by the addition of acid or by reason of the fact that some part of the inorganic base in the naturally occurring clay consists of hydrogen.

An example of the preparation of a suitable bentonite-amine reaction product, is as follows:

Example IV

One thousand grams of a Wyoming bentonite are dispersed in 25.45 liters of water, and the slurry formed is allowed to stand for two hours to settle out the non-clay impurities. In a separate vessel, 54.37 grams of glacial acetic acid are added to 240 grams of octadecyl amine, and the amine salt is then dissolved in 1.45 liters of warm water. Upon addition of the amine salts solution to the dispersed bentonite, flocculation occurs and the precipitate, after being filtered, washed, dried and pulverized constitutes the bentonite-organic base reaction product.

Other examples of suitable onium compounds and processes indicating how a bentonite-organic base reaction product may be prepared are found in U.S. Patent No. 2,531,440 to Jordan, issued November 28, 1950, and in U.S. Patent No. 2,531,427 to Hauser, issued November 28, 1950.

Broadly defined, an estersil is an organophilic solid in a supercolloidal state of subdivision, having an internal structure of inorganic siliceous material with a specific surface area of at least 1 m.$^2$/g., having chemically bound to said internal structure —OR groups wherein R is a hydrocarbon radical, wherein the carbon atom attached to oxygen is also attached to at least one hydrogen atom, each —OR group having from 2 to 18 carbon atoms. Estersils are described in detail together with methods for their preparation in Patent No. 2,657,149, issued October 21, 1953 to Iler, Patent No. 2,739,074, issued March 20, 1956 to Iler, Patent No. 2,739,075, issued March 20, 1956 to Iler; and Patent No. 2,739,076, issued March 20, 1956 to Iler.

The thixotropic agents are employed in the resin composition in an amount equal to about 1% to 10% by weight, based on the weight of the epoxide resin employed. The relatively small amount of thixotropic agent employed provides for uniform application and distribution of the resin composition on the glass cloth and prevents the epoxide resin composition, after application to the glass fabric, from running or sagging. Running or sagging of the epoxide resin composition during treatment would result in some areas of the glass cloth being practically devoid of resin composition while other areas would be provided with excess resin composition. Such a condition would prevent uniform application of the treated glass cloth to conductors and would result in poor physical and electrical properties in the resulting insulation. The thixotropic agent also assists in maintaining the catalyst mixture in a stable suspension in the epoxide resin.

Prior to impregnation of the glass fabric it is desirable to first prepare a varnish composition comprising the epoxide resin composition in a suitable solvent. The solvent is subsequently removed by heating or other appropriate means. Suitable solvents are methyl ethyl ketone, acetone, toluene, xylene, isopropanol and the like. Also mixtures of two or more solvents may be employed.

Examples of suitable impregnating varnish compositions are set forth in the following examples.

Example V

| | Parts by weight |
|---|---|
| Epon 1001 | 50 |
| Methyl ethyl ketone | 17 |
| Red iron oxide (finely divided) | 2 |
| Catalyst mixture of Example I | 5 |
| Estersil, such as that sold under the trademark Valron | 3 |

Example VI

| | Parts by weight |
|---|---|
| Epon 1004 | 50 |
| Methyl ethyl ketone | 17 |
| Finely divided clay | 25 |
| Red iron oxide | 2 |
| Catalyst mixture of Example I | 5 |
| Bentonite-amine reaction product of Example IV | 1 |

Example VII

| | Parts by weight |
|---|---|
| Epon 1007 | 50 |
| Methyl ethyl ketone | 17 |
| Finely divided clay | 25 |
| Example I catalyst mixture | 5 |
| Estersil, such as that sold under the trademark Valron | 1 |

Referring to Fig. 1 of the drawing, there is illustrated apparatus 10 for the treatment of glass fiber cloth in accordance with this invention. A roll 12 of glass fabric comprising a sheet 14 of glass fabric is disposed at one end of the apparatus 10. The sheet 14 of glass fiber cloth is drawn from the roll 12 and passes over roller 15 and then passes into a varnish dip pan 16 beneath a roller 18 immersed in epoxide resin varnish composition 20.

The varnish composition 20 comprises the epoxide resin composition of this invention and a suitable solvent for the epoxide resin. The solvent is added in an amount sufficient to provide a solution of various resin solids content, which may advantageously range from about 15 to 75 percent solids content. Composition 20 also contains a curing catalyst in accordance with this invention.

The glass fiber cloth 14, after being impregnated with varnish composition 20 passes between staggered scraper bars 21 by means of which the varnish composition is forced into the interstices of the glass fibers comprising the glass fiber cloth 14. Other suitable means, such as rollers, may be employed to force the varnish into the cloth. The glass fiber cloth then passes through an oven 22 provided with heating elements 24 wherein a temperature suitable for removing the solvent and advancing the epoxide resin to the B-stage is maintained. Usually a temperature of from about 80° C. to 110° C. will be sufficient.

The glass fabric 14 carrying B-stage resin passes over guide rollers 26, 28, and 30, under roller 32 and into varnish dip pan 34 containing a varnish composition 36. Varnish composition 36 is the same as varnish composition 20 contained in dip pan 16. The glass fabric is withdrawn from varnish composition 36 and is drawn over scraper 37 so as to remove any adhering superficial varnish composition from that one side of the glass fabric which makes contact with the glass fabric. The coated glass fabric is then passed through oven 38 containing heating elements 40 where the epoxide resin is advanced to the B-stage. The temperature of oven 38 is maintained at about the same temperature as that of oven 22.

The product withdrawn from the oven 38 is a sheet 42 carrying B-stage epoxide resin, and may be wound onto a roll 44 for storage. The treated sheet 42 can also be cut into tapes of various widths, for example, of the order of about ½ inch to 1¼ inches. The tapes can then be employed in winding operations for insulating purposes.

As illustrated in Fig. 2 of the drawing, the treated sheet 42 comprises a body 50 impregnated with epoxide resin in the B-stage and carrying on its upper surface a thin surface layer 52 of epoxide resin in the B-stage while the bottom surface 54 of the sheet is substantially free from any superficial epoxide resin. It is desirable that the sheet 42 carry B-stage epoxide resin in an amount equal to from about 100% to 400% of the weight of the glass fabric.

If it is desirable to provide a thicker surface layer 52 on the body 50, the second impregnation step as set forth above may be repeated as many times as necessary to obtain the desired thickness. Coatings of a thickness of from about 2 to 20 mils have proven satisfactory.

The treated glass fabric of this invention can be employed as electrical insulation in either sheet form or in the form of tapes. The treated glass fabric can be prepared and stored for long periods of time without any adverse effects. The epoxide resin comprising the treated cloth remains stable for prolonged periods of time at room temperature. Tapes prepared in accordance with this invention have successfully been employed as electrical insulation after being stored, at room temperature, for a period of about six months.

Tapes may be prepared in rolls, stored and used when desired. The rolls can be unrolled with ease as no sticking or blocking occurs between the layers of tape comprising the roll. The tapes have good flexibility, high tensile strength, are not tacky, and are non-toxic. Previous attempts at preparing glass fabric tape treated with epoxide resins has resulted in tapes of high toxicity, thus resulting in some dermatitis to the users.

The treated glass cloth of this invention need only be wrapped around an electrical conductor without further application of any binder or impregnant and then heat treated under pressure to give a compact insulation having good electrical properties. It is desirable to apply the treated glass cloth to the electrical conductor so that the coated side of the glass fabric comes into contact with the base conductor.

The heat treatment under pressure cures the epoxide resin to an infusible, insoluble state. The resulting insulation has good dielectric strength and good chemical and solvent resistance. The insulation is compact and adheres well to the electrical conductor. Pressure of the order of about 100 to 150 p.s.i. and temperatures of the order of 135° C. to 150° C. will ordinarily be adequate to cure the epoxide resin to an insoluble, infusible state. The time required to cure the epoxide resin will ordinarily be from about 4 hours to 6 hours depending on the temperature and pressure employed.

Example VIII

A sheet of glass fabric 4 mils thick was impregnated and coated with the resin varnish composition of Example VI in the manner hereinbefore set forth, so as to provide treated glass cloth having a resin coating of about 6 mils on one side thereof, the other side being substantially free from resin. The treated cloth carried resin equal to about 210% the weight of the glass cloth. The treated cloth was cut into 6 inch squares. A sufficient number of squares were superimposed one on the other to provide a stack having a thickness of about ¹⁄₁₆ inch. The stack was consolidated under 150 p.s.i. at a temperature of about 140° C. for a period of about 4 hours to form a laminate. The laminate had a 60 cycle power factor of less than 1%. After humidification at 96% relative humidity at room temperature for 268 hours the laminate had a power factor of less than 3%.

While the present invention has been described with reference to particular embodiments thereof, it will be understood that certain changes, modifications and substitutions may be made therein without departing from its scope.

We claim as our invention:

1. In the method of preparing treated glass cloth adaptable for use as electrical insulation, the steps comprising applying to a sheet of glass fabric a resin varnish composition composed of (1) a glycidyl polyether derived from a dihydric phenol and an epihalohydrin, (2) a volatile organic solvent for said glycidyl polyether, (3) a curing catalyst for said glycidyl polyether comprising a mixture of (a) from 2% to 25% by weight, based on the weight of the polyether, of at least one borate ester having the formula

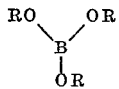

wherein R is selected from the group consisting of aliphatic, aromatic and cyclohexyl groups and (b) from 2% to 25% by weight, based on the weight of the polyether, of at least one trialkylolamine-titanate ester having the formula

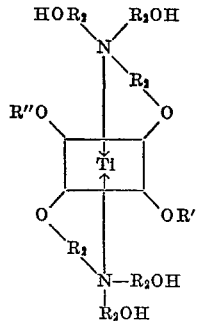

wherein $R_2$ is a bivalent alkylene radical and R' and R'' are selected from the group consisting of aliphatic and aromatic groups and (4) from 1% to 10% by weight, based on the weight of the polyether, of a thixotropic agent, the resin varnish composition after having been applied being forced into the interstices of the glass fabric to thoroughly impregnate the glass fabric, subjecting the impregnated sheet of glass fabric to heat to evaporate the solvent and advance the glycidyl polyether to the B-stage, applying to the impregnated sheet of glass fabric at least one coating of the said resin varnish composition, and heating the treated sheet to remove the volatile solvent and to advance the glycidyl polyether to the B-stage.

2. In the method of preparing treated glass cloth adaptable for use as electrical insulation, the steps comprising applying to a sheet of glass fabric a resin varnish composition composed of (1) a glycidyl polyether derived from a dihydric phenol and an epihalohydrin, (2) a volatile organic solvent for said glycidyl polyether, (3) a curing catalyst for said glycidyl polyether comprising a mixture of (a) from 2% to 25% by weight, based on the weight of the polyether, of at least one borate ester having the formula

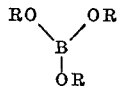

wherein R is selected from the group consisting of aliphatic, aromatic and cyclohexyl groups and (b) from 2% to 25% by weight, based on the weight of the polyether, of at least one trialkylolamine-titanate ester having the formula

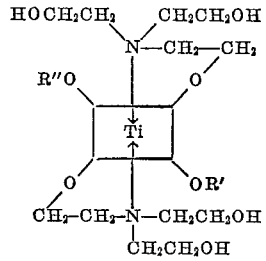

wherein R' and R'' are selected from the group consisting of aliphatic and aromatic groups and (4) from 1% to 10% by weight, based on the weight of the polyether, of a thixotropic agent, the resin varnish composition after having been applied being forced into the interstices of the glass fabric to thoroughly impregnate the glass fabric, subjecting the impregnated sheet of glass fabric to heat to evaporate the solvent and advance the glycidyl polyether to the B-stage, applying to the impregnated sheet of glass fabric at least one coating of the said resin varnish composition, and heating the treated sheet to remove the volatile solvent and to advance the glycidyl polyether to the B-stage.

References Cited in the file of this patent

UNITED STATES PATENTS

| | | |
|---|---|---|
| 2,631,137 | Loritsch | Mar. 10, 1953 |
| 2,674,648 | Nicodemus | Apr. 6, 1954 |
| 2,690,984 | Crandall et al. | Oct. 5, 1954 |
| 2,809,184 | Langer | Oct. 8, 1957 |
| 2,824,851 | Hall | Feb. 25, 1958 |

OTHER REFERENCES

Schildknecht: (Book), High Polymers, vol. X, page 471, Interscience Publishers Inc., New York, Feb. 28, 1956.